United States Patent
Ford et al.

(10) Patent No.: US 10,243,276 B2
(45) Date of Patent: Mar. 26, 2019

(54) PHASED ARRAY ANTENNA SYSTEM INCLUDING A MODULAR CONTROL AND MONITORING ARCHITECTURE

(71) Applicant: The Boeing Company, Chicago, IL (US)

(72) Inventors: Robert G. Ford, Snohomish, WA (US); Frank R. Brogden, Auburn, WA (US); Jay W. Clement, Kent, WA (US); Rodney K. Bonebright, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 14/880,744

(22) Filed: Oct. 12, 2015

(65) Prior Publication Data
US 2017/0104268 A1  Apr. 13, 2017

(51) Int. Cl.
*H01Q 3/26* (2006.01)
*H01Q 21/00* (2006.01)
(Continued)

(52) U.S. Cl.
CPC .......... *H01Q 21/0025* (2013.01); *H01Q 3/36* (2013.01); *H04B 7/0617* (2013.01); *G01S 3/023* (2013.01);
(Continued)

(58) Field of Classification Search
CPC .......... H01Q 3/267; H01Q 3/36; H01Q 21/06; H01Q 21/061
(Continued)

(56) References Cited

U.S. PATENT DOCUMENTS

| 4,931,803 | A | * | 6/1990 | Shimko | ................ | H01Q 3/2605 |
| | | | | | | 342/371 |
| 4,980,691 | A | * | 12/1990 | Rigg | ....................... | H01Q 3/36 |
| | | | | | | 342/372 |

(Continued)

FOREIGN PATENT DOCUMENTS

| EP | 2697863 A1 | 2/2014 |
| WO | 2012141624 A1 | 10/2012 |

OTHER PUBLICATIONS

European Patent Office; Extended European Search Report for European Patent Application No. 16188452.3 dated Jun. 28, 2017, 20 Pages.

(Continued)

*Primary Examiner* — Gregory C. Issing
(74) *Attorney, Agent, or Firm* — Sage Patent Group

(57) ABSTRACT

A phased array antenna system includes a plurality of radio frequency (RF) tile sub-arrays. Each RF tile sub-array includes a multiplicity of RF elements, a tile control integrated circuit, a multiplicity of RF integrated circuits and a configuration storage device. The configuration storage device stores data including calibration and configuration information that is unique to the RF tile sub-array and the tile control integrated circuit. The multiplicity of RF integrated circuits, the multiplicity of RF elements, and the configuration storage device are disposed on a single associated RF tile sub-array. The system also includes an antenna controller configured to process data for steering or tracking one or more RF beams by the multiplicity of RF elements. The calibration and configuration information that is unique to the RF tile sub-array is downloaded from the configuration storage device through the tile control integrated circuit to an RF element compensation table.

20 Claims, 6 Drawing Sheets

(51) Int. Cl.
*H01Q 3/36* (2006.01)
*H04B 7/06* (2006.01)
*G01S 3/02* (2006.01)
*G01S 13/02* (2006.01)

(52) U.S. Cl.
CPC ...... *G01S 2013/0245* (2013.01); *H01Q 3/267* (2013.01)

(58) Field of Classification Search
USPC .......................................................... 342/372
See application file for complete search history.

(56) References Cited

U.S. PATENT DOCUMENTS

| | | | | |
|---|---|---|---|---|
| 5,089,716 A * | 2/1992 | Wallis | ................... | H03K 17/687 307/101 |
| 6,166,705 A * | 12/2000 | Mast | ................... | H01Q 1/38 342/372 |
| 6,587,077 B2 * | 7/2003 | Vail | ................... | H01Q 3/26 342/368 |
| 6,606,056 B2 | 8/2003 | Brogden | | |
| 6,690,324 B2 * | 2/2004 | Vail | ................... | H01Q 1/38 342/372 |
| 6,897,829 B2 * | 5/2005 | Oliver | ................... | H01Q 3/26 342/372 |
| 8,872,719 B2 * | 10/2014 | Warnick | ................... | H01Q 21/061 343/853 |
| 2003/0095066 A1 | 5/2003 | Brogden | | |
| 2004/0219950 A1 | 11/2004 | Pallonen et al. | | |
| 2005/0253770 A1 | 11/2005 | Edward et al. | | |
| 2008/0303716 A1 | 12/2008 | Gallivan et al. | | |
| 2014/0210666 A1 * | 7/2014 | Maltsev | ................... | H01Q 3/40 342/368 |
| 2014/0210667 A1 * | 7/2014 | Wang | ................... | H01Q 3/34 342/372 |
| 2014/0354507 A1 | 12/2014 | Maca et al. | | |
| 2014/0357319 A1 | 12/2014 | Maltsev et al. | | |

OTHER PUBLICATIONS

European Patent Office; Partial European Search Report for European Patent Application No. 16188452.3 dated Mar. 3, 2017, 8 Pages.

* cited by examiner

PHASED ARRAY ANTENNA SYSTEM INCLUDING A MODULAR CONTROL AND MONITORING ARCHITECTURE

FIELD

The present disclosure relates to antennas and antenna systems, and more particularly to a phased array antenna system including a modular control and monitoring architecture.

BACKGROUND

Phased array antennas include a multiplicity of antenna elements that may be arranged in a predetermined pattern. For example, the antenna elements may be arranged in rows and columns, although other arrangements may also be used depending upon the purpose, application or other parameters. Each of the antenna elements needs to be controlled to control a direction of propagation of a radio frequency (RF) beam created or transmitted by the phased array antenna. Controlling a direction of transmission or reception of RF beams or signals by the phased array antenna may be referred to as beam steering or tracking. Electronically steered phased array antennas typically require a great deal of data calculation and processing to create and control the RF beam. The control signals then have to be distributed to the antenna elements which typically require a significant number of electrical data connections. This can limit the expandability of the phased array antenna, particularly in applications where there may be size and space limitations such on aircraft or spacecraft. Additionally, phased array antenna applications on aircraft or spacecraft may require a level of performance with management of multiple RF beams simultaneously. Beam steering or tracking performance may be required to support a wide range of vehicle angular rates and accelerations. Tracking performance is preferably independent of the number of RF elements, RF beams or the size of transmit and receive apertures.

SUMMARY

In accordance with an embodiment, a phased array antenna system may include a plurality of radio frequency (RF) tile sub-arrays arranged in a certain pattern to define an RF aperture. Each RF tile sub-array may include a multiplicity of RF elements and each RF element may be separately controlled for steering or tracking an RF beam generated or received by the RF element. Each RF tile sub-array further includes a tile control integrated circuit, a multiplicity of RF integrated circuits and a configuration storage device connected to the tile control integrated circuit. The configuration storage device stores data comprising calibration and configuration information that is unique to the RF tile sub-array and the tile control integrated circuit. The multiplicity of RF integrated circuits, the multiplicity of RF elements, and the configuration storage device are disposed on a single associated RF tile sub-array. The tile control integrated circuit is operatively connected to each of the multiplicity of RF integrated circuits on the single associated RF tile sub-array and each RF integrated circuit is operatively connected to one or more RF elements of the multiplicity of RF elements on the single associated RF tile sub-array. The phased array antenna system may also include an antenna controller configured to process data for steering or tracking one or more RF beams by the multiplicity of RF elements. The antenna controller may additionally include a plurality of aperture state machines. An aperture state machine may be associated with each RF tile sub-array for controlling operation of the associated RF tile sub-array. The aperture state machine associated with each RF tile sub-array includes an RF element compensation table. The calibration and configuration information that is unique to the RF tile sub-array is downloaded from the configuration storage device through the tile control integrated circuit to the RF element compensation table. The phased array antenna system may further include a plurality of RF tile buses. One RF tile bus may operatively couple each aperture state machine to the associated RF tile sub-array.

In accordance with another embodiment, a phased array antenna system may include a plurality of radio frequency (RF) tile sub-arrays arranged in a certain pattern to define an RF aperture. Each RF tile sub-array may include a multiplicity of RF elements and each RF element may be separately controllable for steering or tracking an RF beam. Each RF tile sub-array includes a configuration storage device that stores data including calibration and configuration information that is unique to each RF tile sub-array. Each RF sub-array may also include a multiplicity of RF integrated circuits. Each RF integrated circuit is operatively connected to one or more RF elements. The RF tile sub-array may also include a tile control integrated circuit configured to individually control the multiplicity of RF elements. The RF tile sub-array may additionally include a clock and serial bus matrix that operatively connects the multiplicity of RF integrated circuits to the tile control integrated circuit. The tile control integrated circuit, the multiplicity of RF integrated circuits, the multiplicity of RF elements, and the configuration storage device are disposed on a single associated RF tile sub-array. The phased array antenna system may also include an antenna controller configured to process data for steering or tracking one or more RF beams generated or received by the multiplicity of RF elements. The antenna controller includes a plurality of aperture state machines. An aperture state machine is associated with each RF tile sub-array for controlling operation of the associated RF tile sub-array. The aperture state machine associated with each RF tile sub-array includes an RF element compensation table. The calibration and configuration information that is unique to the RF tile sub-array is downloaded from the configuration storage device through the tile control integrated circuit to the RF element compensation table. The RF tile sub-array may additionally include a plurality of RF tile buses. One RF tile bus may be associated with each RF tile sub-array that operatively couples the associated RF tile sub-array to the antenna controller.

In accordance with a further embodiment, a method for controlling and monitoring a phased array antenna system may include receiving data for use in steering or tracking a radio frequency (RF) beam. The method may also include downloading calibration and configuration information from each RF tile sub-array of a plurality of RF tile sub-arrays to an RF element compensation table of a respective aperture state machine associated with each RF tile sub-array. The calibration and configuration information is unique to each RF tile sub-array and the calibration and configuration information is downloaded from a configuration storage device on each RF tile sub-array through a tile control integrated circuit on each RF tile sub-array to the RF element compensation table. The method may also include concurrently and separately processing the data to provide unique control data to each RF tile sub-array of a plurality of RF tile sub-arrays. Each RF tile sub-array may include a multiplicity of RF elements. A multiplicity of RF integrated circuits are operatively connected to one or more of the multiplicity of RF elements. A tile control integrated circuit is operatively connected to each of the multiplicity of RF integrated circuits. The multiplicity of RF elements, the multiplicity of RF integrated circuits, the tile control integrated circuit and the configuration storage device are disposed on a single associated RF tile sub-array. Each RF element may be separately controlled for steering or tracking the RF beam generated by the RF element or received by the RF element based on the unique control data. The method may further include transmitting each unique control data to a corresponding RF tile sub-array over an RF tile bus of a plurality of RF tile buses. One RF tile bus of the plurality of RF tile buses is associated with each RF tile sub-array of the plurality of RF tile sub-arrays.

In accordance with another embodiment or any of the previous embodiments, the antenna controller may further include an antenna manager. The antenna manager may be configured to receive data for steering or tracking the one or more RF beams and to transmit control and status data and beam pointing information to one of the aperture state machines in response to RF elements of the RF tile sub-array associated with the one aperture state machine being selected for use for steering or tracking the one or more RF beams.

In accordance with another embodiment or any of the previous embodiments, each aperture state machine may be configured for processing RF element phase data for the associated RF tile sub-array using spherical coordinates and a phase compensation function. The RF element phase data allows the associated RF tile sub-array to steer or track the one or more RF beams. The plurality of aperture state machines provides concurrent processing of RF tile sub-array phase data from a steering or tracking solution to loading the RF element phase data in the associated RF tile sub-arrays.

In accordance with another embodiment or any of the previous embodiments, each aperture state machine may include an RF compensation table that receives information from the antenna manager for use in determining a steering or tracking solution and determines RF element compensation data based on the information. Each aperture state machine may also include a tile multi-beam phase and true time delay calculator pipeline that receives RF element compensation data from the RF element compensation table and beam point information from the antenna manager. The tile multi-beam phase and true time delay calculator determines a phase shift value for each RF element of the associated RF sub-array based on the RF element compensation information and the beam pointing information. The aperture state machine may also include a tile physical layer (PHY) coupling the tile multi-beam phase and true time delay calculator pipeline to an associated RF tile bus.

BRIEF DESCRIPTION OF THE DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
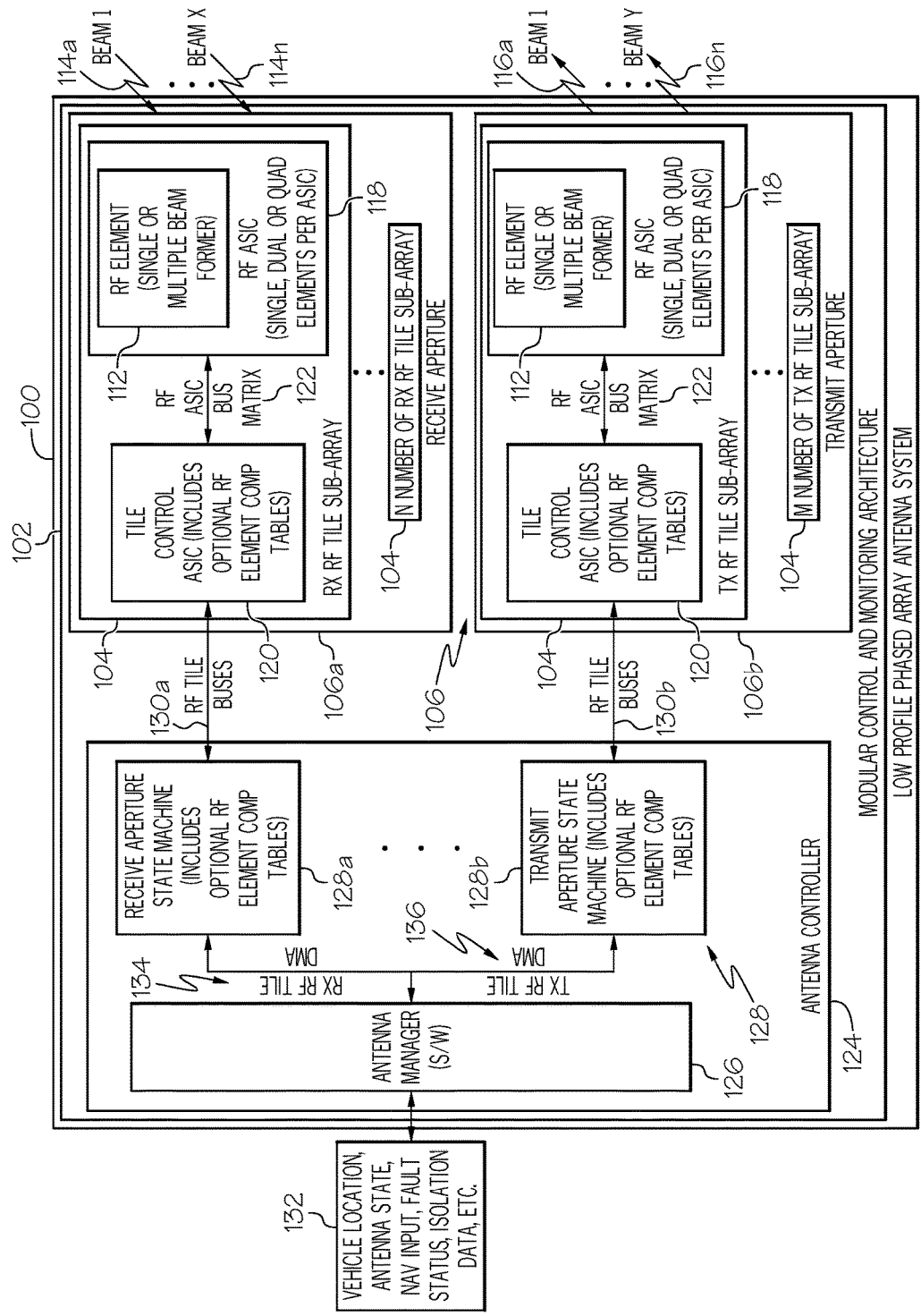
FIG. 1 is a block schematic diagram of an example of a phased array antenna system including a modular control and monitoring architecture in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Certain terminology is used herein for convenience only and is not to be taken as a limitation on the embodiments described. For example, words such as "proximal", "distal", "top", "bottom", "upper," "lower," "left," "right," "horizontal," "vertical," "upward," and "downward", etc., merely describe the configuration shown in the figures or relative positions used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 is a block schematic diagram of an example of a phased array antenna system 100 including a modular control and monitoring architecture 102 in accordance with an embodiment of the present disclosure. The phased array antenna system 100 may be a low profile phased array antenna system that may be used on a vehicle, such as for example, an aircraft or aerospace vehicle wherein the low profile phased array antenna or antenna system 100 will provide negligible if any drag or effect on the performance of the vehicle. The phased array antenna system 100 may include a plurality of radio frequency (RF) tile sub-arrays 104 that may be arranged in a certain pattern to define an RF aperture 106. The plurality of RF tile sub-arrays 104 may include a first group of RF tile sub-arrays 104 that may define a receive aperture 106a and a second group of RF tile sub-arrays 104 that may define a transmit aperture 106b. The RF tile sub-arrays 104 of the receive aperture 106a and the RF tile sub-arrays 104 of the transmit aperture 106b may have the same structure. The first group of RF tile sub-arrays 104 of receive aperture 106a and the second group of RF tile sub-arrays 104 of transmit aperture 106b may each include an equal number of RF tile sub-arrays 104 or a different number of RF tile sub-arrays 104. Each RF tile sub-array 104 may include a multiplicity of RF elements 112 for transmitting and receiving RF signals. Each RF element 112 may be separately controllable for steering or tracking an RF beam 114, 116 generated or received by the RF element 112 or group of RF elements 112. An RF element 112 or group of RF elements 112 of the receive aperture 106a may track a single received RF beam 114a or multiple received RF beams 114a-114n. An RF element 112 or group of RF elements 112 of the transmit aperture 106b may steer a single transmitted RF beam 116a or multiple transmitted RF beams 116a-116d. The RF beams 114, 116 may include RF signals.

Each RF tile sub-array 104 may also include a multiplicity of RF integrated circuits or application-specific integrated circuits (ASICs) 118. An RF ASIC 118 may be associated with each RF element 112 for controlling operation of the RF element 112. Each RF ASIC 118 may be operatively coupled to one, two or four RF elements 112 for controlling operation of the associated single RF element 112, or dual or quad RF elements 112.

Each RF tile sub-array 104 may also include a tile control integrated circuit or ASIC 120 for addressing and controlling operation of each of the RF ASICs 118. Each tile control ASIC 120 may be implemented in an application specific integrated circuit (ASIC), field programmable gate array (FPGA) or complex programmable logic device (CPLD). The tile control ASIC 120 may be operatively coupled to each of the RF ASICs 118 by an RF ASIC bus matrix 122 which may also be referred to herein as a clock and data serial bus matrix. The tile control ASIC 120 may address a specific RF ASIC 118 by a clock line and a data line as described in more detail herein. An example of an RF tile sub-array that may be used for each of the RF tile sub-arrays 104 will be described in more detail with reference to FIG. 4.

The phased array antenna system 100 may also include an antenna controller 124. The antenna controller 124 may be configured to process data received by the antenna controller 124 for steering or tracking the one or more RF beams 114-116 by the multiplicity of RF elements 112. The antenna controller 124 may include an antenna manager 126 and a plurality of aperture state machines 128 operatively coupled to the antenna manager 126. The plurality of aperture state machines 128 may include a group of receive aperture state machines 128a and a group of transmit aperture state machines 128b. An aperture state machine 128 may be associated with each RF tile sub-array 104 for controlling operation of the associated RF tile sub-array 104. An example of an aperture state machine that may be used for each of the aperture state machines 128 will be described with reference to FIG. 2.

The phased array antenna system 100 may also include a plurality of RF tile buses 130. One RF tile bus 130 may operatively couple each aperture state machine 128 to its associated RF tile sub-array 104. Accordingly, each receive aperture state machine 128a may be operatively coupled by a single RF tile bus 130a to a respective RF tile sub-array 104 of the receive aperture 106a. Similarly, each transmit aperture state machine 128b may be operatively coupled by a single RF tile bus 130b to a respective RF tile sub-array 104 of the transmit aperture 106b. Each RF tile bus 130 may be a half-duplex synchronous serial bus for RF element 112 data transport to reduce electrical connections to each RF tile sub-array 104 to four pins as described in more detail with reference to FIG. 3.

The antenna manager 126 may be configured to receive data 132 for steering or tracking the one or more RF beams 114-116 and to transmit control and status data and beam pointing information to one of the aperture state machines 128 in response to the RF elements 112 of the RF tile sub-array 104 associated with the one aperture state machine 128 being selected for use for steering or tracking the one or more RF beams 114-116. Examples of the data 132 received by the antenna manager 126 may include but is not necessarily limited to a geographic location of the vehicle, such as global positioning system (GPS) information, antenna state information, navigational information, such as vehicle speed, directional heading, rates of angular motion of the vehicle or other vehicle attitude or state information, RF element fault status, RF element isolation data, and any other information that may be useful for steering or tracking the RF beam or beams 114-116. The data 132 may be received from different sensors on a vehicle. The antenna manager 126 may process the received data and may transmit control data to one or more receive aperture state machines 128a or to one or more transmit aperture state machines 128b depending upon which RF tile sub-array or sub-arrays 104 are being controlled by the control data. Control data may be sent by the antenna manager 126 to a selected one or more receive aperture state machine 128a depending upon which RF tile sub-array or arrays 104 of the receive aperture 106a are being controlled for tracking one or more received RF beams 114a-114n. Similarly, control data may be sent by the antenna manager 126 to a selected one or more transmit aperture state machine 128b depending upon which RF tile sub-array or sub-arrays 104 of the transmit aperture 106b are being controlled for steering a transmitted RF beam or beams 116a-116n.

The antenna manager 126 may also receive status and/or other information from the respective RF tile sub-arrays 104 of the receive aperture 106a and the transmit aperture 106b via the RF tile bus 130 and aperture state machine 128 associated with the particular RF tile sub-array 104. The control data and status information exchanged between the antenna manager 126 and the receive aperture state machines 128a may include a receive (RX) RF tile direct memory access (DMA) 134. Similarly, the control and status information exchanged between the antenna manager 126 and the transmit aperture state machines 128b may include a transmit (TX) RF tile DMA 136. An example of an RX RF tile DMA 134 and a TX RF tile DMA 136 will be described in more detail with reference to FIG. 2.

Each aperture state machine 128 may be configured for processing RF element phase data for the associated RF tile sub-array 104 using beam pointing information in spherical coordinates and a phase compensation function. The RF element phase data may allow the associated RF tile sub-array 104 to steer or track the one or more RF beams 114/116. The plurality of aperture state machines 128 provides concurrent processing of RF tile sub-array phase data from a steering or tracking solution to loading the RF element phase data in the associated RF tile sub-arrays 104.

Figure 2:
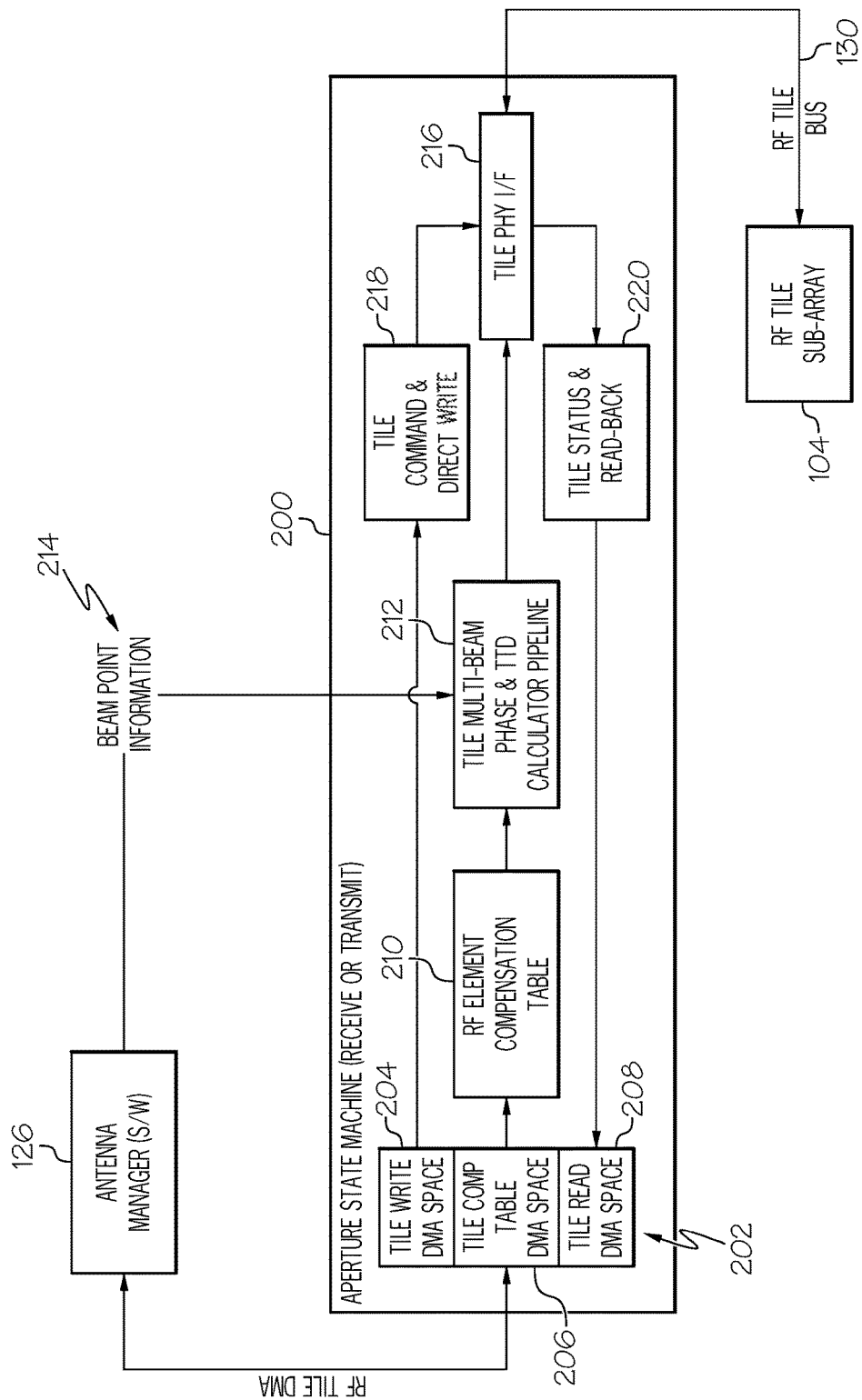
FIG. 2 is a block schematic diagram of an example of an aperture state machine for controlling operation of an RF tile sub-array of an antenna aperture of a phased array antenna system in accordance with an embodiment of the present disclosure.

FIG. 2 is a block schematic diagram of an example of an aperture state machine 200 for controlling operation of an RF tile sub-array of an antenna aperture of a phased array antenna system in accordance with an embodiment of the present disclosure. The exemplary aperture state machine 200 may be used for each of the receive aperture state machines 128a and transmit aperture state machines 128b in FIG. 1. The aperture state machine 200 may receive an aperture control and status DMA stack 202. The aperture control and status DMA stack 202 may correspond to an RX RF tile DMA 134 in FIG. 1 if the aperture state machine 200 is a receive aperture state machine 128a. The aperture control and status DMA stack 202 may correspond to a TX RF tile DMA 136 in FIG. 1 if the aperture state machine 200 is a transmit aperture state machine 128b. The aperture control and status DMA stack 202 may include a tile write DMA space 204, a tile compensation table DMA space 206 and a tile read DMA space 208. The tile write DMA space 204 may include RF tile sub-array command and direct write data for controlling operations of a particular RF tile sub-array 104 associated with the aperture state machine 200. The tile compensation table DMA space 206 may include data for use in determining phase compensation or phase delay values for the RF elements 112 of the particular RF sub-array 104 associated with the aperture state machine 200 similar to that described herein with reference to FIG. 7. The tile read DMA space 208 may include data from the particular RF sub-array 104 associated with the aperture state machine 200.

The aperture state machine 200 may include an RF element compensation table 210 that may receive information from the antenna manager 126 for use in determining a steering or tracking solution and for determining RF element phase compensation data based on the information. The RF element compensation table 210 may receive data or information in the tile compensation table DMA space 206 of the aperture control and status DMA stack 202. The data or information in the tile compensation table DMA space 206 may be used by the RF element compensation table 210 to determine phase compensation values for particular RF elements 112 of the RF tile sub-array 104 associated with the aperture state machine 200 for steering the transmitted RF beams 116a-116n or tracking the received RF beams 114a-114n.

The RF compensation table 210 compensates for differences in delay (phase) between each RF element's 112 interface to a received or transmitted electromagnetic wave or RF signal in free space to a point in the RF circuitry of the RF tile sub-array 104 where the RF signals from all RF elements 112 are combined. The RF compensation table 210 may be referred to more specifically as a phase compensation table. The contents of an RF compensation table 210 or phase compensation table may be unique from one manufactured RF tile sub-array 104 to another, due to normal manufacturing process variation in a circuit board of the particular RF tile sub-array 104 and in the RF ASIC's 118 installed on the particular RF tile sub-array 104. This results in a need to store this unique compensation/calibration data in non-volatile memory (configuration storage device 422 in FIG. 4), for each RF tile sub-array 104, during factory test/calibration, so the unique compensation/calibration data may be recalled and used for phase calculation in the antenna controller 124 during operation. Other unique compensation tables may be included in the same non-volatile memory, including but not limited to attenuator settings and bias settings for the internal amplifiers in the element RF ASIC's 118.

The aperture state machine 200 may also include a tile multi-beam phase and true time delay (TTD) calculator pipeline 212. The multi-beam phase and TTD calculator pipeline 212 may receive RF element compensation data from the RF element compensation table 210 and beam point information 214 from the antenna manager 126. The tile multi-beam phase and TTD calculator pipeline 212 may determine a phase shift value for each RF element 112 of the RF sub-array 104 associated with the aperture state machine 200 based on the RF element compensation information from the RF element compensation table 210 and the beam pointing information 214. The tile multi-beam phase and TTD calculator pipeline 212 may use a method of phase calculation similar to that described in U.S. Pat. No. 6,606,056, entitled "Beam Steering Controller for a Curved Surface Phased Array Antenna," which is assigned to the same assignee as the present application and is incorporated herein by reference in its entirety. An exemplary method of phase calculation similar to that described in U.S. Pat. No. 6,606,056 that may be used by the tile multi-beam phase and TTD calculator pipeline 212 will be described with reference to FIG. 6. The method may be replicated for each beam in a multi-beam application. The phase and TTD calculator pipeline 212 may be scaled to any number of RF tile sub-arrays 104 and any practical number of RF elements 112 per RF tile sub-array 104. Because each RF tile sub-array's phase information is processed concurrently, the processing time increases only with the number of RF elements 112 per RF tile sub-array 104. RF elements 112 up to 128 per RF tile sub-array 104 may be processed in a nominal two millisecond beam update time. The antenna controller 124 and RF sub-arrays 104 are configured to provide RF beam updates at a cycle time of about two milliseconds or less and RF beam steering or tracking performance for vehicle angular rates greater than about 60 degrees per second.

The aperture state machine 200 may additionally include a tile physical layer (PHY) interface 216. The tile PHY interface 216 may operatively couple the tile multi-beam phase and TTD calculator pipeline 212 to an associated RF tile bus 130. The tile PHY interface 216 may convert the control data to an appropriate electrical waveform for transmission over the RF tile bus 130 to the RF tile sub-array 104 associated with the aperture state machine 200 and that is operatively coupled to the aperture state machine 200 by the associated RF tile bus 130. An example of an appropriate electrical waveform may be an electrical waveform compatible with Telecommunications Industry Association/Electronics Industries Alliance (TIA/EIA) technical standard RS-422/485, Low Voltage Differential Signaling (LVDS) or TIA/EIA technical standard 644, Ethernet (Institute of Electrical and Electronic Engineers technical standard IEEE-802.3xxxx), or other data transmission method congruent with the physical media and distance.

The aperture state machine 200 may additionally include a tile command and direct write module 218. The tile command and direct write module 218 may receive data or information in the tile write DMA space 204 of the aperture control and status DMA stack 202 from the antenna manager 126. The tile command and direct write module 218 may be connected to the tile PHY interface 216 for sending the tile command and write information to the RF tile sub-array 104 associated with the aperture state machine 200 over the associated RF tile bus 130.

The aperture state machine 200 may also include a tile status and read-back module 220 for receiving status and read-back information from the RF tile sub-array 104 associated with the aperture state machine 200. The status and read-back information may be received from the RF tile sub-array 104 by the tile PHY interface 216 over the associated RF tile bus 130. The tile status and read-back information may be sent by the tile status and read-back module 220 to the antenna manager 126 using the tile read DMA space 208 of the aperture control and status DMA stack 202. The aperture state machine 200 and the associated RF tile bus 130 provide direct memory access from the antenna manager 126 to the RF tile sub-array 104 that is operatively coupled to the aperture state machine 200 by the associated RF tile bus 130.

The aperture state machines 200 may be implemented in a configurable logic device or devices, such as for example a field programmable gate array (FPGA).

Figure 3:
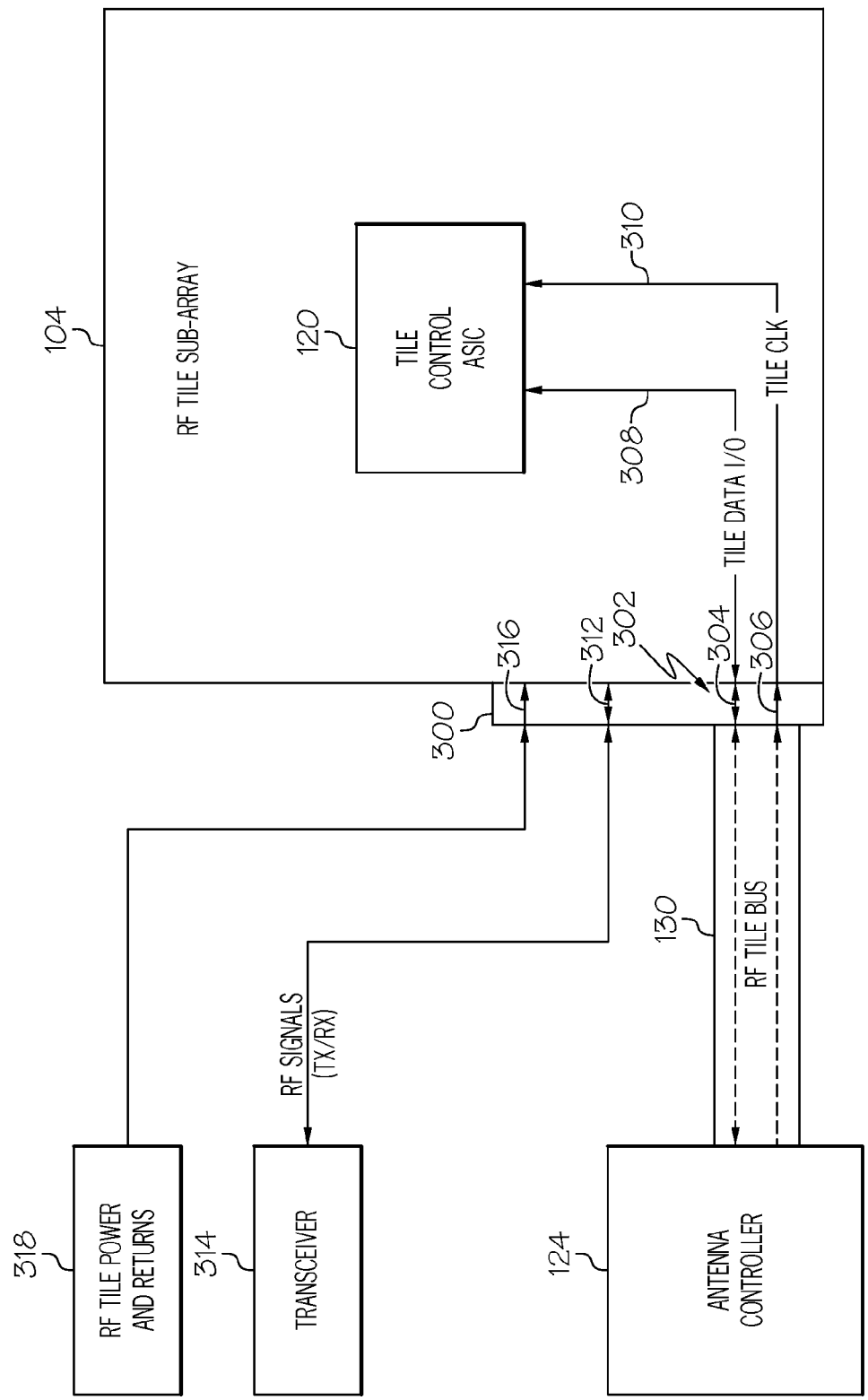
FIG. 3 is a detailed block schematic diagram illustrating an example of a tile connector of an RF tile sub-array in accordance with an embodiment of the present disclosure.

FIG. 3 is a block schematic diagram illustrating an example of a tile connector 300 of an RF tile sub-array 104 in accordance with an embodiment of the present disclosure. The tile connector 300 may include a tile bus connection 302 for connecting to the RF tile bus 130. The tile bus connector may include two ports or pins, a tile data input/output port 304 or pin and tile clock input port 306 or pin. The tile data input/output port 304 may be operatively connected to the tile control ASIC 120 by a tile data input/output link 308 or line (TILE DATA I/O). The tile clock input port 306 may be operatively connected to the tile control ASIC 120 by a tile clock link 310 or line (TILE CLK). As previously described, the RF tile bus 130 may be a half-duplex synchronous serial bus.

The tile connector 300 may also include an RF signal port 312 or pin for transmitting and receiving RF signals between the RF tile sub-array 104 and a transceiver 314. Induced noise by the RF signals may be minimized in the tile connector 300 by using balanced differential electrical signals. For example, LVDS or technical standard TIA/EIA 644 or similar data transmission standard may be used to minimize induced noise. The tile connector 300 may further include an RF tile power and returns port 316 or pin for providing electrical power to the RF tile sub-array 104 from an RF tile power and returns module 318. Accordingly, electrical connections to each RF tile sub-array 104 may be limited to four ports or pins. All control and status data to the RF tile sub-array 104 may flow through the tile connector 300. Because the tile connector 300 has only four pins or ports, the tile connector 300 may be very compact which permits the tile connector 300 to be placed at an optimal location for RF signal connectivity for each of the plurality of RF tile sub-arrays 104. For example, the tile connector 300 may be placed in different locations on the RF tile-sub-array 104 or around a perimeter of the RF tile sub-array 104 for different RF tile sub-arrays 104 to provide optimal connectivity and routing of RF signal wiring.

Figure 4:
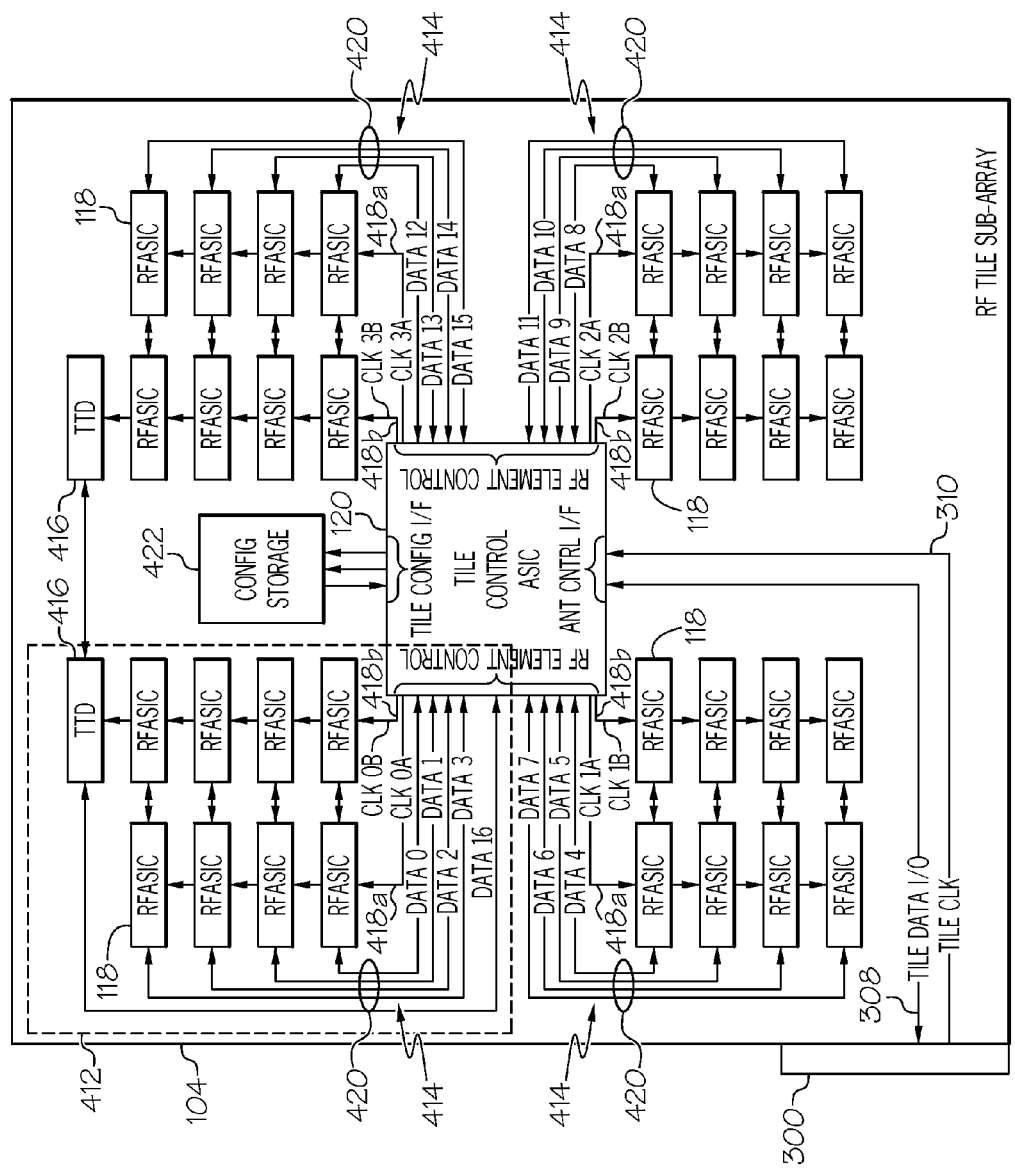
FIG. 4 is a block schematic diagram of an example of an RF tile sub-array in accordance with an embodiment of the present disclosure.

FIG. 4 is a detailed block schematic diagram of an exemplary RF tile sub-array 104 in accordance with an embodiment of the present disclosure. As previously described, the RF tile sub-array 104 may include a tile control integrated circuit or tile control ASIC 120. A tile data input/output link 308 or line (Tile Data I/O) connects the tile control ASIC 120 to the associated RF tile bus 130 via a tile connector 300 (FIG. 3). A tile clock link 310 or line (TILE CLK) also connects the tile control ASIC 120 to the RF tile bus 130 via the tile connector 300. The tile control ASIC 120 may be configured to individually control a multiplicity of RF elements 112 (FIG. 1) in response to data received from the antenna manager 124 over the RF tile bus 130.

The RF tile sub-array 104 may also include a multiplicity of RF integrated circuits or RF ASICs 118. Each RF ASIC 118 may be operatively coupled to one, two or four RF elements 112 (FIG. 1) for controlling operation of the operatively connected RF element or elements 112.

Each RF tile sub-array 104 may have a predetermined shape. For example, each RF tile sub-array 104 may be substantially square or rectangular shaped as shown in the exemplary RF tile sub-array 104 in FIG. 4. Although the RF tile sub-array 104 may not be perfectly square or rectangular and may define other geometric shapes, such as triangular, hexagonal, rhomboid, etc. depending upon the use or application of the phased array antenna system 100. The multiplicity of RF ASICs 118 may be arranged in quadrants 412 on the RF tile sub-array 104 similar to that illustrated in the exemplary embodiment in FIG. 4. Each quadrant 412 of RF ASICs 118 may be operatively connected to the tile control ASIC 120 by a clock and data serial bus matrix 414 that may limit a number of interconnect pins on each RF ASIC 118 to four. Each clock and data serial bus matrix 414 may include two clock lines (CLK #A and CLK #B) 418a, 418b. The RF tile sub-array 104 may include at least one true time delay (TTD) circuit 416 for each RF beam 114, 116 for controlling the phase delay of the entire RF tile sub-array 104. TTD circuit 416 is used to extend the bandwidth of the RF aperture 106 (FIG. 1). One TTD circuit 416 may be used per RF beam 114, 116 per RF tile sub-array 104.

The RF ASICs 118 and TTD circuit 416 or circuits 416 may be selectively addressed by the two clock lines 418a and 418b and plurality of data lines 420 of each clock and data serial bus matrix 414. The clock lines 418a and 418b may be serially connected to each RF ASIC 118 and TTD circuit 416, if present, of each quadrant 412. In the exemplary embodiment of FIG. 4, each data line 420 may serial connect two RF ASICs 118. In other embodiments, more than two RF ASICs 118 may be serially connected requiring additional clock lines for each additional RF ASIC 118. The RF ASICs 118 and TTD circuit 416, if present, in the quadrant 412 may be connected as party line slaves with the tile control ASIC 120 as the master.

The RF tile sub-array 104 may also include a configuration storage device 422. The configuration storage device 422 may be any type of data storage device or memory. The configuration storage device 422 may store data comprising calibration and configuration information that may be unique to the particular RF tile sub-array 104. The multiplicity of RF elements 112 of a particular RF tile sub-array 104 may be calibrated in phase with one another during initial manufacturing to support a correlated beam function during operation of the phased array antenna system 100. The unique phase calibration and compensation data for each RF tile element 112 of the particular RF tile sub-array 104 may be stored in the configuration storage device 422. This allows repair or replacement of the RF tile sub-array 104 without recalibration of the entire phased array antenna system 100. Additionally, the RF element phase calibration and compensation data may be downloaded to the antenna controller 124 (FIG. 1) and used in the beam forming phase computations.

Accordingly, the RF tile sub-array 104 is a self-contained RF sub-array 104 in a single assembly that contains a minimum amount of control-status implementation and relies on an antenna controller 124 (FIG. 1) for processing the RF element 112 phase data. The RF element 112 phase processing is contained in the antenna control function in the antenna controller 124 and is described with reference to FIG. 6 herein. The antenna control-monitoring architecture 102 described herein is extensible to virtually any practical number of RF tile sub-arrays 104 while maintaining a low-cost implementation.

Figure 5:
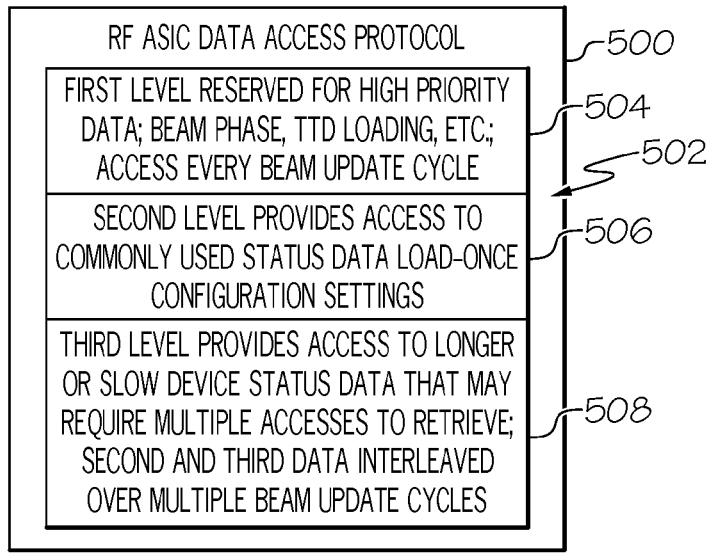
FIG. 5 is a representation of an example of an RF application-specific integrated circuit (ASIC) data access priority protocol in accordance with an embodiment of the present disclosure.

FIG. 5 is a representation of an RF ASIC data access priority protocol 500 in accordance with an embodiment of the present disclosure. Each RF ASIC 118 (FIG. 4) may use a three-level data access protocol 502 for prioritizing data access to each RF element 112 (FIG. 1). A first level of data access priority 504 is reserved for highest priority data. Examples of highest priority data may include but is not necessarily limited to beam phase, TTD loading and similar data for controlling operation and/or tracking or steering of the RF element 112 which may be accessed every beam update cycle. A second level of data access priority 506 or intermediate level of data access priority may provide access to intermediate level data. Examples of intermediate level data may include but is not necessarily limited to commonly used status data, load-once configuration settings or similar data. A third level of data access priority 508 or lowest level data access priority may provide access to longer or slow device status that may require multiple accesses to retrieve. Second and third level data access priority 506 and 508 may be interleaved over multiple RF beam update cycles. Accordingly, highest priority data having the first level of data access priority 504 may be transmitted or accessed without interference by data in the second and third level data access priority 506 and 508. This multi-level access scheme supports efficient RF element connectivity to the antenna controller 124 and provides greater status for fault detection and isolation compared to current phase array antenna systems.

Figure 6:
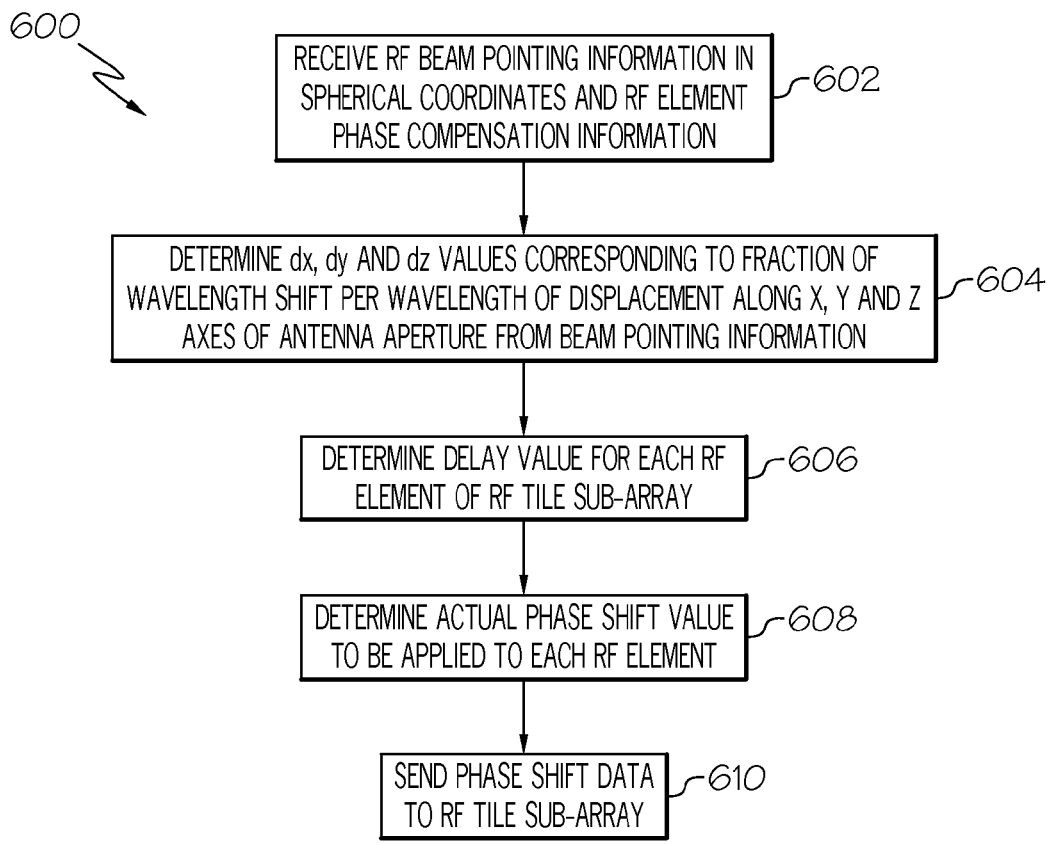
FIG. 6 is a flow chart of an example of a method for determining a phase shift for each RF element for steering or tracking an RF beam in accordance with an embodiment of the present disclosure.

FIG. 6 is a flow chart of an example of a method 600 for determining a phase shift for each RF element for steering or tracking an RF beam in accordance with an embodiment of the present disclosure. The method 600 is similar to the phase calculation described in U.S. Pat. No. 6,606,056 and may be embodied in and performed by the tile multi-beam phase and TTD calculator pipeline 212 in FIG. 2. The method 600 may be replicated for each RF beam 114/116 in a multi-beam application such as the phased array antenna system 100. In block 602, RF beam pointing information and RF element phase compensation information may be received. Similar to that previously described, the RF beam pointing information and RF element compensation information may be received by the tile multi-beam phase and TTD calculator pipeline 212 in FIG. 2 from the antenna manage 126. The RF beam pointing information may be in spherical coordinates where Theta (θ) is an angle of elevation and Phi (φ) is an azimuth angle.

In block 604, dx, dy and dz wavelength shift values may be determined from the beam pointing information. The dx, dy and dz wavelength shift values may each correspond to a fraction of a wavelength shift per wavelength displacement along a respective X, Y and Z axis of an antenna aperture of a phased array antenna based on the beam pointing information. The values may be represented according to the following equations:

$$dx=\sin(\theta)*\cos(\phi) \qquad \text{Eq. 1}$$

$$dy=\sin(\theta)*\sin(\phi) \qquad \text{Eq. 2}$$

$$dz=\cos(\theta) \qquad \text{Eq. 3}$$

In block 606, a delay value for each RF element of the RF tile sub-array may be determined. The delay value for each RF element may be determined according to equation 4:

$$\text{Element\_Delay}=dx*\Delta X+dy*\Delta Y+dz*\Delta Z \qquad \text{Eq. 4}$$

ΔX, ΔY and ΔZ are the X, Y and Z displacements (in wavelengths) of each RF element 112 from a predefined center of the antenna aperture. The Element_Delay is a 2's complement signed delay in wavelengths required for the signal from a given RF element to a predetermined center of the phased array antenna, in order to sum in-phase with signals from other RF elements of the array.

In block 608, an actual phase shift value to be applied to each RF element may be determined. The actual phase shift value to be applied to each RF element may be determined according to equation 5:

$$\text{Element\_Phase\_Shift}=\text{Truncate\_to\_1\_wavelength} \\ (\text{Round\_to\_}N\text{\_bit}(\text{Element\_Delay})) \qquad \text{Eq. 5}$$

Where N is the number of bits used to control the phase shifter in order to produce $2^N$ phase states. The Element Phase Shift may be an actual phase shift value, in modulo 1 wavelength, loaded into each RF element. The Element Phase Shift value may be truncated such that only the N bits to the right of the binary point are kept. This may provide a precision of $2^{-N}$ (i.e., $½^N$) wavelengths for the actual phase shift values.

In block 610, the phase shift data may be sent to the RF tile sub-array for application to the particular RF elements.

Figure 7:
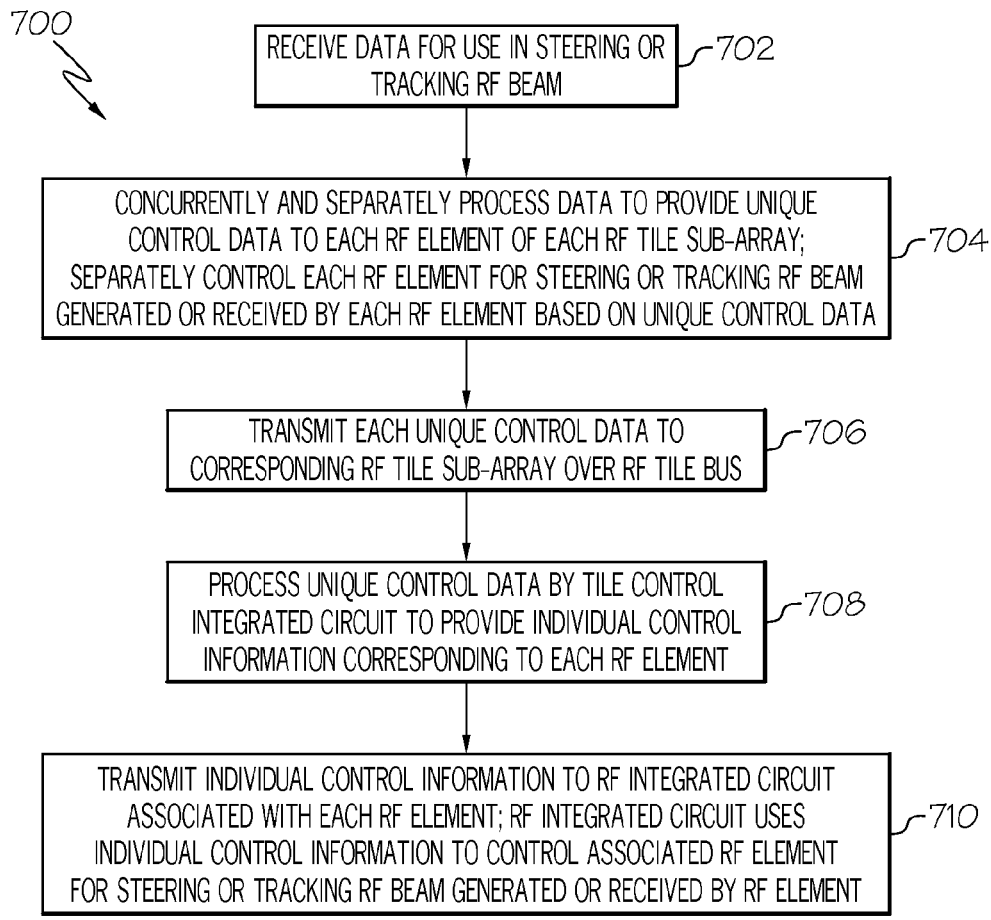
FIG. 7 is a flow chart of an example of a method for controlling and monitoring a phased array antenna system in accordance with an embodiment of the present disclosure.

FIG. 7 is a flow chart of an example of a method 700 for controlling and monitoring a phased array antenna system in accordance with an embodiment of the present disclosure. The method 700 may be embodied in and performed by the phased array antenna system 100 in FIG. 1. In block 702, data for use in steering or tracking a radio frequency (RF) beam may be received. The data may be received by an antenna controller similar to antenna controller 124 in FIG. 1. As previously described, the examples of the data may include but is not necessarily limited to a geographic location of the vehicle, such as global positioning system (GPS) information, antenna state information, navigational information, such as vehicle speed, directional heading, rates of angular motion of the vehicle or other vehicle attitude or state information, RF element fault status, RF element isolation data, and any other information that may be useful for steering or tracking an RF beam or beams such as RF beams 114-116 in FIG.

In block 704, the data may be concurrently and separately processed to provide unique control data to each RF tile sub-array of a plurality of RF tile sub-arrays. Similar to that previously described, each RF tile sub-array may include a multiplicity of RF elements and each RF element may be separately controllable for steering or tracking the RF beam generated by the RF element or received by the RF element based on the unique control data.

In block 706, each unique control data may be transmitted to a corresponding RF tile sub-array over an RF tile bus of a plurality of RF tile buses. In block 708, the unique control data may be processed by a tile control integrated circuit or ASIC of the RF tile sub-array to provide individual control information corresponding to each RF element of the RF tile sub-array.

In block 710, the individual control information may be transmitted to an RF integrated circuit or RF ASIC associated with each RF element. The RF ASIC may use the individual control information to control the associated RF element for steering or tracking the RF beam.

Figure 8:
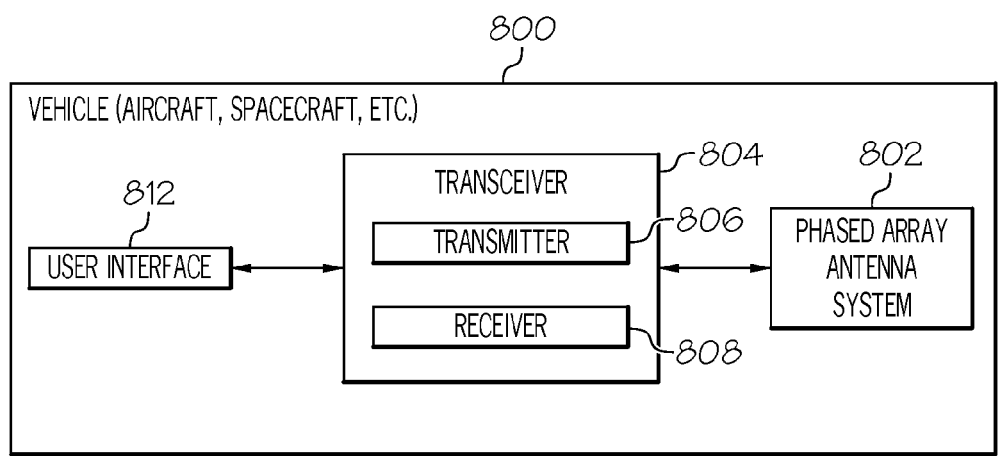
FIG. 8 is a block schematic diagram of a vehicle including a phased array antenna system in accordance with an embodiment of the present disclosure.

FIG. 8 is a block schematic diagram of a vehicle 800 including a phased array antenna system 802 in accordance with an embodiment of the present disclosure. The phased array antenna system 802 may be similar to the phased array antenna system 100 described with reference to FIG. 1.

A transceiver 804 may be operatively coupled to the phased array antenna system 802 and the transceiver 804 may be configured for transmitting and receiving RF signals using the phased array antenna system 802. The transceiver 804 may include a transmitter 806 for transmitting RF signals using the phased array antenna system 802 and a receiver 808 for receiving RF signals using the phased array antenna system 802.

The transceiver 804 may also include an antenna direction control module 810 or controller configured for steering or tracking RF beams carrying RF signals that are either transmitted or received by the phased array antenna system 802.

A user interface 812 may also be operatively coupled to the transceiver 804 for controlling operation of the transceiver 804.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A phased array antenna system (100), comprising:
a plurality of radio frequency (RF) tile sub-arrays (104) arranged in a certain pattern to define an RF aperture (106), each RF tile sub-array (104) comprising a multiplicity of RF elements (112), each RF element (112) being separately controllable for steering or tracking an RF beam (114, 116) generated or received by the RF element (112), and each RF tile sub-array further comprising a tile control integrated circuit, a multiplicity of RF integrated circuits and a configuration storage device connected to the tile control integrated circuit, wherein the configuration storage device stores data comprising calibration and configuration information that is unique to the RF tile sub-array and the tile control integrated circuit, the multiplicity of RF integrated circuits, the multiplicity of RF elements, and the configuration storage device are disposed on a single associated RF tile sub-array, the tile control integrated circuit is operatively connected to each of the multiplicity of RF integrated circuits on the single associated RF tile sub-array and each RF integrated circuit is operatively connected to one or more RF elements of the multiplicity of RF elements on the single associated RF tile sub-array;
an antenna controller (124) configured to process data for steering or tracking one or more RF beams by the multiplicity of RF elements, the antenna controller comprising a plurality of aperture state machines (128*a*, 128*b*), an aperture state machine being associated with each RF tile sub-array for controlling operation of the associated RF tile sub-array, the aperture state machine associated with each RF tile sub-array comprising an RF element compensation table, wherein the calibration and configuration information that is unique to the RF tile sub-array is downloaded from the configuration storage device through the tile control integrated circuit to the RF element compensation table; and
a plurality of RF tile buses (130), one RF tile bus operatively coupling each aperture state machine (128*a*, 128*b*) to the associated RF tile sub-array (104).

2. The phased array antenna system (100) of claim 1, wherein the antenna controller (124) further comprises an antenna manager (126), the antenna manager being configured to receive data for steering or tracking the one or more RF beams (114, 116) and to transmit control and status data and beam pointing information to one of the aperture state machines (128*a*, 128*b*) in response to RF elements (112) of the RF tile sub-array (104) associated with the one aperture state machine (128*a*, 128*b*) being selected for use for steering or tracking the one or more RF beams (114, 116).

3. The phased array antenna system (100) of claim 2, wherein each aperture state machine (128, 200) is configured for processing RF element phase data for the associated RF tile sub-array using beam pointing information (214) and RF element phase compensation data (602), the RF element phase data allows the associated RF tile sub-array to steer or track the one or more RF beams, the plurality of aperture state machines provides concurrent processing of RF tile sub-array phase data from a steering or tracking solution to loading the RF element phase data in the associated RF tile sub-arrays.

4. The phased array antenna system (100) of claim 2, wherein each aperture state machine (128, 200) comprises:
- the RF compensation table (210) that receives information from the antenna manager (126) for use in determining a steering or tracking solution and determines RF element compensation data based on the information;
- a tile multi-beam phase and true time delay calculator pipeline (212) that receives RF element compensation data from the RF element compensation table and beam point information from the antenna manager, wherein the tile multi-beam phase and true time delay calculator pipeline determines a delay for each RF element of the associated RF sub-array based on the RF element compensation data and the beam pointing information; and
- a tile physical layer (PHY) interface (216) coupling the tile multi-beam phase and true time delay calculator pipeline to an associated RF tile bus.

5. The phased array antenna system (100) of claim 4, wherein each aperture state machine (128, 200) further comprises:
- a tile command and direct write module (218) for receiving tile command and write information in a tile write DMA space (204) from the antenna manager (126), the tile command and direct write module being connected to the tile PHY interface (216) for sending the tile command and write information to the associated RF tile sub-array (104) via the associated RF tile bus (130); and
- a tile status and read-back module (220) for receiving status and read-back information from the associated RF tile sub-array (104) via the associated RF tile bus (130), the tile status and read-back module (220) being connected to the tile PHY interface (216).

6. The phased array antenna system (100) of claim 1, wherein the aperture state machine (128, 200) and an associated RF tile bus provide a direct memory access from an antenna manager of the antenna controller to the associated RF tile sub-array.

7. The phased array antenna system (100) of claim 1, wherein each RF tile sub-array (104) comprises a tile connector (300), the tile connector comprising:
- a tile bus connection (302) including a tile data input/output port (304) and a tile clock input port (306);
- an RF signal port (312) for receiving and transmitting RF signals from and to the RF tile sub-array; and
- an RF tile power and returns port (316) for providing electrical power to the RF tile sub-array.

8. The phased array antenna system (100) of claim 7, wherein each RF tile sub-array (104) further comprises:
- a tile data input/output link (308) that connects the tile control integrated circuit to an associated RF tile bus (130) via the tile connector (300); and
- a tile clock link (310) that connects the tile control integrated circuit (120) to the RF tile bus (130) via the tile connector (300), wherein the tile control integrated circuit (120) is configured to individually control the multiplicity of RF elements (112) in response to data received from the antenna controller (124) over the RF tile bus (130).

9. The phased array antenna system (100) of claim 8, wherein each RF integrated circuit (118) is operatively connected to one, two or four RF elements (112) for controlling operation of the operatively connected RF element or RF elements (112).

10. The phased array antenna system (100) of claim 9, wherein each RF tile sub-array (104) comprises a predetermined shape and the multiplicity of RF integrated circuits (118) are arranged in quadrants (412) on the RF tile sub-array (104) and each quadrant of RF integrated circuits are operatively connected to the tile control integrated circuit by a clock and data serial bus matrix (414) that limits a number of interconnect pins on each RF integrated circuit to four.

11. The phased array antenna system (100) of claim 10, wherein each RF tile sub-array (104) comprises at least one true time delay circuit (416) per RF beam (114, 116).

12. The phased array antenna system (100) of claim 11, wherein the RF integrated circuits (118) and the true time delay circuit (416) are connected as party line slaves with the tile control integrated circuit as master.

13. The phased array antenna system of claim 1, wherein the tile control integrated circuit is located at a central location on the RF tile sub-array and the multiplicity of RF integrated circuits are arranged in quadrants surrounding the tile control integrated circuit on the RF tile sub-array.

14. The phased array antenna system (100) of claim 1, wherein the multiplicity of RF elements (112) of a particular RF tile sub-array (104) are calibrated in phase with one another to support a correlated beam function and the calibration and configuration information stored in the configuration storage device (422) allows replacement of the RF tile sub-array without recalibration of the phased array antenna system (100).

15. The phased array antenna system (100) of claim 1, wherein the antenna controller (124) and RF sub-arrays (104) are configured to provide RF beam updates at a cycle time of about 2 milliseconds or less and RF beam steering or tracking performance for vehicle angular rates greater than about 60 degrees per second.

16. A phased array antenna system (100), comprising:
- a plurality of radio frequency (RF) tile sub-arrays (104) arranged in a certain pattern to define an RF aperture (106), each RF tile sub-array comprising:
  - a multiplicity of RF elements (112), each RF element being separately controllable for steering or tracking an RF beam, wherein each RF tile sub-array comprises a configuration storage device (422) that stores data comprising calibration and configuration information that is unique to each RF tile sub-array;
  - a multiplicity of RF integrated circuits, each RF integrated circuit being operatively connected to one or more RF elements;
  - a tile control integrated circuit (120) configured to individually control the multiplicity of RF elements (112);
  - a clock and serial bus matrix (414) that operatively connects the multiplicity of RF integrated circuits to the tile control integrated circuit, wherein the tile control integrated circuit, the multiplicity of RF integrated circuits, the multiplicity of RF elements, and the configuration storage device are disposed on a single associated RF tile sub-array;
- an antenna controller (124) configured to process data for steering or tracking one or more RF beams generated or received by the multiplicity of RF elements, wherein the antenna controller (124) comprises a plurality of aperture state machines (128a, 128b, 200), an aperture state machine being associated with each RF tile sub-array (104) for controlling operation of the associated RF tile sub-array (104), the aperture state machine associated with each RF tile sub-array comprising an RF element compensation table, wherein the calibration and configuration information that is unique to the RF tile sub-array is downloaded from the configuration storage device through the tile control integrated circuit to the RF element compensation table; and a plurality of RF tile buses (130), one RF tile bus (130) associated with each RF tile sub-array (104) that operatively couples the associated RF tile sub-array (104) to the antenna controller (124).

17. The phased array antenna system (100) of claim 16, wherein the antenna controller (124) comprises a plurality of aperture state machines (128*a*, 128*b*, 200), an aperture state machine being associated with each RF tile sub-array (104) for controlling operation of the associated RF tile sub-array (104), the one RF tile bus (130) operatively coupling each aperture state machine (128*a*, 128*b*, 200) to the associated RF tile sub-array (104).

18. A method for controlling and monitoring a phased array antenna system (700), comprising:

receiving data for use in steering or tracking a radio frequency (RF) beam (702);

downloading calibration and configuration information from each RF tile sub-array of a plurality of RF tile sub-arrays to an RF element compensation table of a respective aperture state machine associated with each RF tile sub-array, wherein the calibration and configuration information is unique to each RF tile sub-array and the calibration and configuration information is downloaded from a configuration storage device on each RF tile sub-array through a tile control integrated circuit on each RF tile sub-array to the RF element compensation table;

concurrently and separately processing the data to provide unique control data to each RF tile sub-array of a plurality of RF tile sub-arrays (704), each RF tile sub-array comprising a multiplicity of RF elements, a multiplicity of RF integrated circuits operatively connected to one or more of the multiplicity of RF elements, a tile control integrated circuit operatively connected to each of the multiplicity of RF integrated circuits, wherein the multiplicity of RF elements, the multiplicity of RF integrated circuits, the tile control integrated circuit and the configuration storage device are disposed on a single associated RF tile sub-array and each RF element being separately controllable for steering or tracking the RF beam generated by the RF element or received by the RF element based on the unique control data; and transmitting each unique control data to a corresponding RF tile sub-array over an RF tile bus of a plurality of RF tile buses (706), wherein one RF tile bus of the plurality of RF tile buses is associated with each RF tile sub-array of the plurality of RF tile sub-arrays.

19. The method of claim 18, further comprising:

processing the unique control data by the tile control integrated circuit of the RF tile sub-array (708) to provide individual control information corresponding to each RF element of the RF tile sub-array; and transmitting the individual control information to an RF integrated circuit associated with each RF element (710), the RF integrated circuit using the individual control information to control the associated RF element for steering or tracking the RF beam.

20. The phased array antenna system of claim 1, wherein the calibration and configuration information that is unique to a particular RF tile sub-array is determined during factory testing and calibration and stored on the configuration storage device of the particular RF tile sub-array.

* * * * *